US009609340B2

United States Patent
Brueck et al.

(10) Patent No.: US 9,609,340 B2
(45) Date of Patent: Mar. 28, 2017

(54) JUST-IN-TIME (JIT) ENCODING FOR STREAMING MEDIA CONTENT

(71) Applicant: UPLYNK, LLC, Newbury Park, CA (US)

(72) Inventors: David F. Brueck, Saratoga Springs, UT (US); C. Ryan Owen, Riverton, UT (US); Tyler Bye, Lehi, UT (US); Nathan James Edwards, Orem, UT (US); Ken Brueck, Lehi, UT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 623 days.

(21) Appl. No.: 13/729,342

(22) Filed: Dec. 28, 2012

(65) Prior Publication Data

US 2014/0247887 A1    Sep. 4, 2014

Related U.S. Application Data

(60) Provisional application No. 61/580,847, filed on Dec. 28, 2011.

(51) Int. Cl.
*H04N 19/40* (2014.01)
*H04N 21/2343* (2011.01)
*H04N 21/24* (2011.01)

(52) U.S. Cl.
CPC ....... *H04N 19/40* (2014.11); *H04N 21/23439* (2013.01); *H04N 21/2408* (2013.01)

(58) Field of Classification Search
CPC ................................................. H04L 29/06489
USPC ..................................................... 375/240.26
See application file for complete search history.

(56) References Cited

U.S. PATENT DOCUMENTS

| 4,535,355 | A  | 8/1985  | Am et al.        |
|-----------|----|---------|------------------|
| 5,953,506 | A  | 9/1999  | Karla et al.     |
| 6,091,775 | A  | 7/2000  | Hibi et al.      |
| 6,091,777 | A  | 7/2000  | Guetz et al.     |
| 6,195,680 | B1 | 2/2001  | Goldszmidt et al.|
| 6,366,614 | B1 | 4/2002  | Pian et al.      |
| 6,389,473 | B1 | 5/2002  | Carmel et al.    |
| 6,486,803 | B1 | 11/2002 | Luby et al.      |
| 6,490,627 | B1 | 12/2002 | Karla et al.     |
| 6,510,553 | B1 | 1/2003  | Hazara           |
| 6,574,591 | B1 | 6/2003  | Kleiman et al.   |

(Continued)

FOREIGN PATENT DOCUMENTS

| CA | 2466482    | 5/2003 |
|----|------------|--------|
| EP | 0711077 A2 | 5/1996 |

(Continued)

OTHER PUBLICATIONS

Wicker, Stephen B., "Error Control Systems for Digital Communication and Storage", Prentice-Hall, Inc., New Jersey, USA, 1995 (Book: see NPL's Parts 1-6).

(Continued)

*Primary Examiner* — Jamie Atala
*Assistant Examiner* — Fabio Lima (57) ABSTRACT

A method and system for just-in-time (JIT) encoding of media content is described. The JIT encoder allows a server to create one or more slices of requested portions of the media content according to one of the available quality profiles when requested without previously creating and storing different copies of the media content at the different quality profiles.

20 Claims, 4 Drawing Sheets

(56) References Cited

U.S. PATENT DOCUMENTS

| | | |
|---|---|---|
| 6,604,118 B2 | 8/2003 | Kleiman et al. |
| 6,731,600 B1 | 5/2004 | Patel et al. |
| 6,732,183 B1 | 5/2004 | Graham |
| 6,968,387 B2 | 11/2005 | Lanphear |
| 7,075,986 B2 | 7/2006 | Girod et al. |
| 7,096,271 B1 | 8/2006 | Omoigui et al. |
| 7,349,976 B1 | 3/2008 | Glaser et al. |
| 7,408,984 B2 | 8/2008 | Lu et al. |
| 2002/0047899 A1* | 4/2002 | Son et al. .................. 348/114 |
| 2002/0073167 A1 | 6/2002 | Powell et al. |
| 2002/0126201 A1* | 9/2002 | Schmitt ............... H04N 7/152 348/14.09 |
| 2002/0144276 A1 | 10/2002 | Radford et al. |
| 2002/0174434 A1 | 11/2002 | Lee et al. |
| 2002/0188745 A1 | 12/2002 | Hughes et al. |
| 2003/0005455 A1 | 1/2003 | Bowers |
| 2003/0067872 A1 | 4/2003 | Harrell et al. |
| 2003/0081582 A1 | 5/2003 | Jain et al. |
| 2003/0107994 A1 | 6/2003 | Jacobs et al. |
| 2003/0135631 A1 | 7/2003 | Li et al. |
| 2003/0151753 A1 | 8/2003 | Li et al. |
| 2003/0152036 A1 | 8/2003 | Quigg Brown et al. |
| 2003/0204519 A1 | 10/2003 | Sirivara et al. |
| 2004/0003101 A1 | 1/2004 | Roth et al. |
| 2004/0030797 A1 | 2/2004 | Akinlar et al. |
| 2004/0031054 A1 | 2/2004 | Dankworth et al. |
| 2004/0054551 A1 | 3/2004 | Ausubel et al. |
| 2004/0071209 A1 | 4/2004 | Burg et al. |
| 2004/0093420 A1 | 5/2004 | Gamble |
| 2004/0143672 A1 | 7/2004 | Padmanabham et al. |
| 2004/0170392 A1 | 9/2004 | Lu et al. |
| 2004/0184540 A1* | 9/2004 | Miura ............ H04N 21/23406 375/240.12 |
| 2005/0108414 A1 | 5/2005 | Taylor et al. |
| 2005/0123058 A1 | 6/2005 | Greenbaum et al. |
| 2007/0024705 A1 | 2/2007 | Richter et al. |
| 2007/0162571 A1* | 7/2007 | Gupta et al. .................. 709/219 |
| 2007/0244929 A1* | 10/2007 | Huang .................. G06Q 30/02 |
| 2008/0028428 A1 | 1/2008 | Jeong et al. |
| 2008/0056373 A1 | 3/2008 | Newlin et al. |
| 2008/0162713 A1 | 7/2008 | Bowra et al. |
| 2008/0195744 A1 | 8/2008 | Bowra et al. |
| 2008/0195745 A1 | 8/2008 | Bowra et al. |
| 2009/0031390 A1* | 1/2009 | Rajakarunanayake et al. .............................. 725/142 |
| 2009/0083279 A1* | 3/2009 | Hasek .............................. 707/10 |
| 2011/0022471 A1* | 1/2011 | Brueck .................. G06Q 30/02 705/14.61 |
| 2011/0058675 A1* | 3/2011 | Brueck .............. H04N 21/2541 380/277 |
| 2011/0150099 A1* | 6/2011 | Owen .............. H04N 21/23406 375/240.26 |
| 2012/0084455 A1* | 4/2012 | McCue et al. ................. 709/231 |
| 2012/0209949 A1* | 8/2012 | Deliyannis et al. .......... 709/217 |
| 2012/0304233 A1* | 11/2012 | Roberts ............ H04N 21/23113 725/82 |
| 2012/0331089 A1* | 12/2012 | Vonog et al. .................. 709/217 |
| 2013/0041808 A1* | 2/2013 | Pham et al. ..................... 705/39 |
| 2013/0198335 A1* | 8/2013 | Goel et al. ..................... 709/219 |

FOREIGN PATENT DOCUMENTS

| | | |
|---|---|---|
| EP | 0919952 A1 | 6/1999 |
| EP | 1641271 A2 | 3/2006 |
| EP | 1670256 A2 | 6/2006 |
| EP | 1777969 A1 | 4/2007 |
| WO | 0067469 | 11/2000 |

OTHER PUBLICATIONS

On2 Technologies, Inc. "TrueMotion VP7 Video Coded", White Paper, Document Version 1.0, Jan. 10, 2005, (13 pages).

Intelligent Streaming, Bill Birney, May 2003, pp. 6 total.

Albanese, Andres, et al. "Priority Encoding Transmission", TR-94-039, Aug. 1994, 36 pages, International Computer Science Institute, Berkeley, California.

Puri, Rohit, et al. "Multiple Description Source Coding Using Forward Error Correction Codes", Oct. 1999, 5 pages, Department of Electrical Engineering and Computer Science, University of California, Berkeley, California.

Pathan, Al-Mukaddim, et al., "A Taxonomy and Survey of Content Delivery Networks", Australia, Feb. 2007. Avaliable at http://www.gridbus.org/reports/CDN-Taxonomy.pdf.

Pantos, E.R. (Oct. 15, 2012). HTTP Live Streaming, download from http://tools.ietf.org/html/draft-pantos-http-live-streaming, 74 pages.

* cited by examiner

JUST-IN-TIME (JIT) ENCODING FOR STREAMING MEDIA CONTENT

RELATED APPLICATIONS

This application claims the benefit of U.S. Provisional Application No. 61/580,847, filed Dec. 28, 2011, the entire contents of which are incorporated herein by reference.

TECHNICAL FIELD

Embodiments of the present invention relate to the field of delivery of media content over a network. Specifically, the embodiments of the present invention relate to just-in-time encoding for streaming media content.

BACKGROUND

The Internet is becoming a primary method for distributing media content (e.g., video and audio or just audio or just video) and other information to end users. It is currently possible to download music, video, games, and other media information to computers, cell phones, and virtually any network capable device. The percentage of people accessing the Internet for media content is growing rapidly. The quality of the viewer experience is a key barrier to the growth of video viewing on-line. Consumer expectations for online video are set by their television and movie viewing experiences.

Audience numbers for streaming video on the web are rapidly growing, and there are a growing interest and demand for viewing video on the Internet. Streaming of data files or "streaming media" refers to technology that delivers sequential media content at a rate sufficient to present the media to a user at the originally anticipated playback speed without significant interruption. Unlike downloaded data of a media file, streamed data may be stored in memory until the data is played back and then subsequently deleted after a specified amount of time has passed.

The process for preparing media content for adaptive streaming typically involves taking a source file, such as a movie, or a source feed, such as a broadcast signal, and splitting it into temporal chunks or slices of media (e.g., video and audio), and encoding each slice of the media at different quality levels. Typically the different quality levels are achieved by encoding the media content at different bit rates according to encoding profiles. During playback, and as network conditions fluctuate, a consuming application selects a slice at one of the different quality levels that is best suited for the present network throughput, and the consuming applications adjusts the quality up or down as available bandwidth increases or decreases by selecting subsequent slices at the appropriate quality levels.

Streaming media content over the Internet has some challenges, as compared to regular broadcasts over the air, satellite, or cable. Although the adaptive streaming approach provides many advantages, one major disadvantage is that each temporal slice must be encoded multiple times, often a dozen or more, depending on the desired number of quality levels and playback devices or platforms. This requires some time and upfront resource costs. In particular, the computational resources required to encode into the multiple formats is often quite large, as is the necessary bandwidth required to move the encoded slices to their location on a web server from which they are served during playback. This encoding process also takes some time. Also, there may be storage costs associated with storing multiple encodings of the media content. For example, a content provider may have a very large library of media. When encoding the media for adaptive streaming, the content provider has to encode the media into the different quality levels and store the multiple copies of the media at the different quality levels for subsequent adaptive streaming to clients. The encoding and storage costs may be justified when the media is popular and is streamed to various clients. However, if the media is not popular, the encoding and storage of multiple copies of that media may not justify the associated cost. These costs for less popular media and even user-created content or user-uploaded content, may prevent content providers and some users from storing this media content online in a format for adaptive streaming.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

A method and system for just-in-time (JIT) encoding of media content is described. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
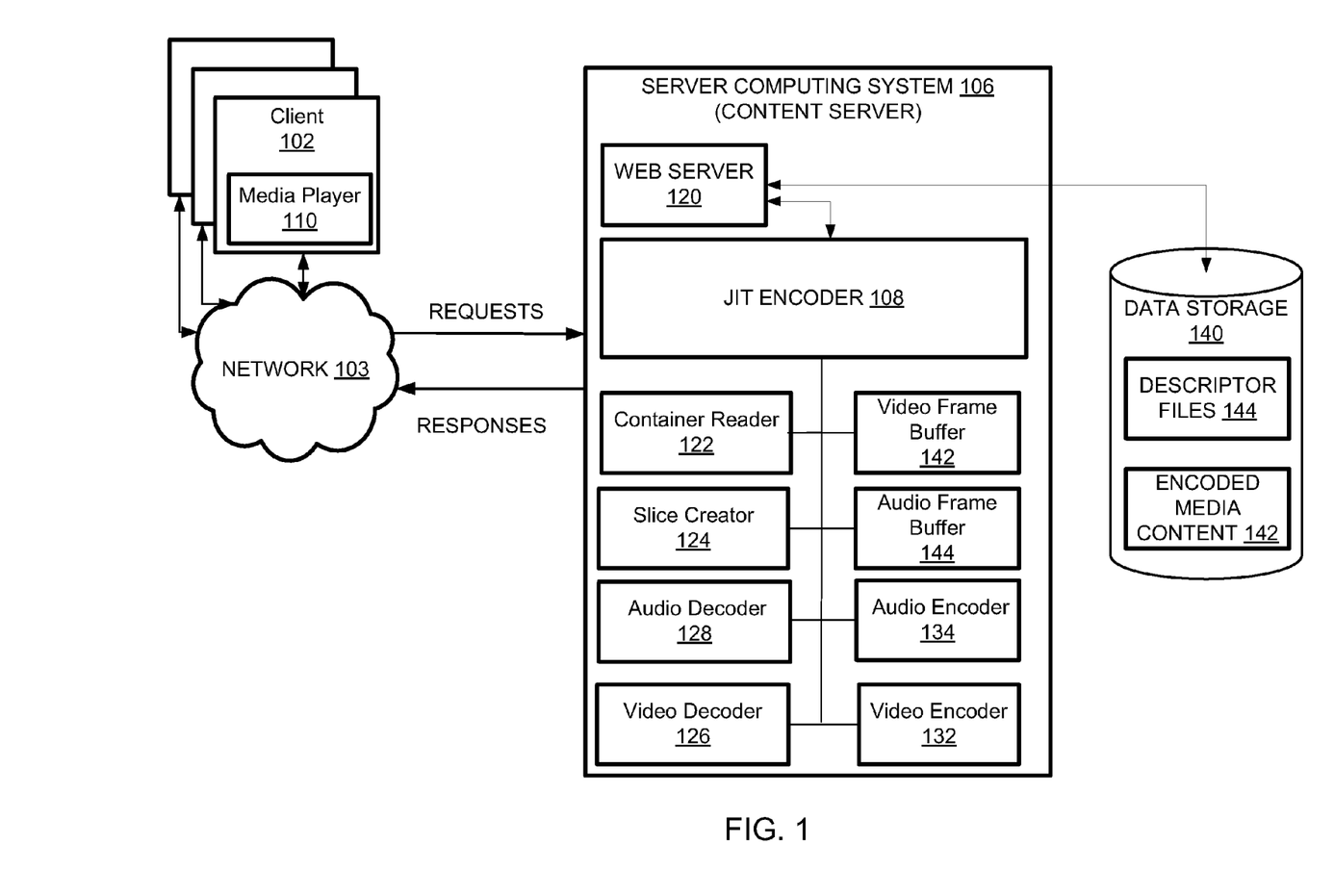
FIG. 1 is a block diagram of exemplary network architecture in which embodiments of just-in-time (JIT) encoder may operate.

FIG. 1 is a block diagram of exemplary network architecture 100 in which embodiments of just-in-time (JIT) encoder may operate. The network architecture 100 may include multiple client computing systems 102 and a server computing system 106 coupled via a data communications network 103 (e.g., public network such as the Internet or private network such as a local area network (LAN)). In one embodiment, the server computing system 106 is a content server that receives requests for media over the network 103 from media players 110 executing on the client computing systems 102. The content server 106 and the client 102 may be coupled by the network 103. The network 103 may include the Internet and network connections to the Internet. Alternatively, the content server 106 and the client 102 may be located on a common Local Area Network (LAN), Personal area network (PAN), Campus Area Network (CAN), Metropolitan area network (MAN), Wide area network (WAN), wireless local area network, cellular network, virtual local area network, or the like. The client 102 may be a client workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like. The client 102 may have access to the Internet via a firewall, a router, or other packet switching devices. The server computing system 106 may be a network appliance, a gateway, a personal computer, a desktop computer, a workstation, etc.

In the depicted embodiment, the server computing system 106 may execute a web server 120, and the JIT encoder 108, which is configured to orchestrate the encoding of media content in a just-in-time fashion for subsequent streaming by the web server 120. Alternatively, the functionality of the JIT encoder 108 and the web server 120 can be distributed over the two machines. For example, in one embodiment, the server computing system 106 may host just the JIT encoder 108 and not the web server 120, and another server computing system (not illustrated) can host the web server 120 to handle requests for the media content. Alternatively, other configurations are possible as would be appreciated by one of ordinary skill in the art having the benefit of this disclosure.

In one embodiment, the computing environment 100 also includes one or more content repositories, illustrated as a data storage device 140. The data storage device 140 may be a content repository in which encoded media content 142 may be stored. A publisher or a distributor of media content may store the encoded media content 142 in the data storage 140. Media content from the publisher may be transferred over the network 130 to the content server 106, which may be configured to receive, process, and store media content. In one embodiment, the content server 106 delivers the media content to the client 102, which is configured to play the content on a media player 110 that is operating on the client 102. The content server 106 delivers the media content by streaming the media content to the client 102. In a further embodiment, the client 102 is configured to receive different portions of the media content from multiple locations.

In other embodiments, media content from the content server 106 may be replicated to other locations and served to the clients 102 using other web servers 120 located on other server computing system. Alternatively, proxy cache servers can be used. For example, the client 102 may request and receive content from any of the multiple web servers 120, or proxy cache servers. In a further embodiment, the media content may be forwarded directly to the other web servers 120 or proxy cache servers through direct communication channels without the need to traverse the Internet. In another embodiment, the web servers 120, proxy cache servers, and content server 106 may be organized in a hierarchy of a CDN to deliver the media content to the client 102. As described above, a CDN is a system of computers networked together across the Internet that cooperates transparently to deliver content. In this embodiment, the content server 106 is the origin content server. The CDN may also include interconnected computer networks or nodes to deliver the media content.

In one embodiment, the publisher stores the encoded media content 142 in an original content file in the data storage 140 to be distributed. The content file may include data corresponding to video and/or audio corresponding to a television broadcast, sporting event, movie, music, concert, or the like. The original content file may include uncompressed video and audio, or alternatively, uncompressed video or audio. Alternatively, the content file may include compressed content (e.g., video and/or audio) using standard or proprietary encoding schemes. The original content file from the publisher may be digital in form and may include media content having a high bit rate, such as, for example, 2 Mbps or greater.

The content server 106 may receive the content file from the publisher. Instead of decompressing the content file (if encoded) into raw audio and/or video, segmenting the raw audio and/or video of the content file into multiple portions of the content (e.g., slices), and storing multiple copies of the content file in the data storage 140, the content server 106 can store the original content file in the data storage 140, and the content server 106 can use the JIT encoder 108 to create a slice of the requested video at the desired quality level on demand, or as suggested by the name, just-in-time. The portions may have an equal duration, or alternatively, the portions may have equal file sizes, or vary one to another according to other requirements. During operation, as described in more detail below, each portion of the encoded media content 142 may be retrieved, decoded, and re-encoded into an encoded representation of that portion of the media content at the specified quality level. Typically, in adaptive streaming, a media content file can be encoded into multiple encoded representations according to different quality profiles and stored as separate files that are independently requestable from the data storage 140 via the web server 120. However, in the embodiments described herein, the media content can be stored in the data storage 140 and encoded at the requested quality level by the JIT encoder 108 and streamed to the client 102 for playback on the media player 110.

In the depicted embodiment, the publisher (or server administrator) can create metadata descriptor files 144. The metadata descriptor files 144 can be fetched or pushed to the media player 110. In one embodiment, the metadata descriptor file 144 is a M3U file. A M3U file is a computer file format that stores multimedia playlists. Typically, a M3U file is a plain text file that specifies the locations of one or more media files. Each line carries one specification, which can be an absolute local pathname, a local pathname relative to the M3U file location, or a URL (both absolute and relative URLs). The M3U file can also include comments, which are prefaced by the '#' character. In extended M3U, the '#' character may also introduce extended directives. The Unicode version of M3U is M3U8, which uses UTF-8 Unicode characters. The metadata descriptor file 144 gives an overview of the content and is initially requested by the media player 110 in order to know how to request specific files or data ranges within a file. It should be noted that the web server sends transport stream files in response to the requests, however, the media content may be stored in one or multiple files. Regardless of how the media content is stored, the web server sends the transport stream files with the corresponding slice of media content requested. When the media content is stored as discrete files, the web server may send the discrete file (encoded according to the appropriate quality profile) as the transport stream file in response to the request. However, when the media content is stored as a single file, an identifier and an offset may be used to retrieve the appropriate slice of the file (encoded according to the appropriate quality profile), and the web server can send this slice as a transport stream file in response to the request.

In one embodiment, the M3U8 file is created with the available quality profiles and where the media content at those profiles are located even though the media content at those different profiles do not exist at those locations until they have not been created by the JIT encoder 108 of the content server 106. For example, the transport stream files may not exist when the M3U8 file is created, and the transport stream files may be created by the JIT encoder 108 in response to a request for the transport stream by the media player 110. The transport stream may be stored at its corresponding locations after being created by the JIT encoder. From the perspective of the media player 110, the transport stream file already exists and is returned in response to the request; however, the transport stream file may not have been generated until requested by the media player 110. The metadata descriptor file may specify addresses of the transport stream files. The media player 110 reads the descriptor file 144 for the media content that is being requested. The metadata descriptor file 144 may also include a unique content identifier (UCID), duration of the media content, available quality profiles, and locations of where the media content can be retrieved. The quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. For example, the media players 110 may individually request different quality levels of the same media content; for example, each media player 200 may request the same portion (e.g., same time index) of the media content but at different quality levels. For example, one media player may request a slice having HD quality video, since the computing device of the requesting media player has sufficient computational power and sufficient network bandwidth, while another media player may request a slice having a lower quality, since its computing device may not have sufficient network bandwidth, for example. In one embodiment, the media player 110 shifts between quality levels at the slice boundaries by requesting slices from different copies (e.g., different quality streams) of the media content. Alternatively, the media player 110 can request the slices using other techniques that would be appreciated by those of ordinary skill in the art having the benefit of this disclosure. The metadata descriptor file 144 may also include other metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information. In one embodiment, a content management system (CMS) publishing system may be used to create the metadata descriptor files 144.

In other embodiments, the computing environment 100 may include other devices, such as directory servers, Digital Rights Management (DRM) servers, statistic servers, devices of a network infrastructure operator (e.g., an ISP), or the like.

Referring back to FIG. 1, the JIT encoder 108 is configured to interact with a container reader 122, a slice creator 124, a video decoder 126, an audio decoder 128, a video encoder 132, an audio encoder 134, a video frame buffer 142, and an audio frame buffer 144. The operations of the JIT and these components are described in detail with respect to FIG. 2.

In one embodiment, the JIT encoder 108 can be used to service a category of content that may not be guaranteed to be accessed enough to justify the storage costs. This media content can be put behind the JIT encoder 108, and the descriptor file 144 can be created to still describe the media content as if the different slices of the different copies at the different bit rates are stored in the data storage 140 when these slices do not exist yet. This descriptor file 144 permits the media player 110 to request the slices, and the JIT encoder 108 handles creating a slice to deliver to the requesting media player just-in-time. From the media player's perspective the slices have already been created and are stored in the data storage 140 for retrieval. For example, a media player may request a slice at a specified time (e.g., 3) at a specified quality level (e.g., F). Instead of serving a static file that corresponds to the specified time (3) and quality level (F) stored in the data storage 140, the JIT encoder 108 creates the slice at the specified time at the quality level at the time of the request. It should be noted that a requested slice may be cached for subsequent requests, but if not in the cache, a new request to retrieve the same slice results in the JIT encoder 108 creates the slice again. It should also be noted that the JIT encoder 108 can have some predictive intelligence to predict slices that may be subsequently requested. For example, if slice 3 at quality level F is requested, the JIT encoder 108 can create slice 4 at quality level F in anticipation of a request for that particular slice, since there is a high probability that slice 4 at quality level F will be requested. This allows the JIT encoder 108 to preemptively encode a few more slices that could be requested. There may be a spectrum between not encoding slices until requested to encode subsequent slices in a predictive fashion. In another embodiment, the JIT encoder 108 can be configured to encode the media content once the JIT encoder 108 receives a specified number of requests for the media content. For example, the JIT encoder 108 can encode the entire media content or portions of the media content when the number of requests for the media content is greater than a specified threshold. In another embodiment, the media content may have an advertisement policy that a content provider stream a 30-second advertisement for a media player to display the media content. In this case, the JIT encoder 108 can retrieve and create the slices for the 30-second advertisement in a predictive manner. The JIT encoder 108 could also retrieve the first few slices of the media content after the advertisement because it can be assumed that if the user watches the 30-second advertisement on the media player, the user intends to watch at least the first portion of the media content.

Typically, when slicing media content for adaptive streaming, an encoder has to process the whole file sequentially in which the encoder reads enough data to create a slice of a fixed duration of the media content, and then it encodes the slice at the appropriate quality profile. The encoder then reads in additional data to have enough to create the next slice, and encode the second slice at the appropriate quality profile. This is repeated until the whole file is encoded. In the embodiments described herein, there is a concept of random access for creating slices. For example, the request for the media content can indicate an arbitrary time in the media content, and the JIT encoder 108 retrieves the appropriate data corresponding to the arbitrary time and creates a slice and encodes the slice when needed. This random access can allow an organization to not encode and store the media content into all the available quality profiles. This random access can also be used in other contexts. For example, the JIT encoder 108 could be used to enable a user to have a home collection of media content for viewing on a HD television, as well as streaming to a user device, such as a tablet or a mobile phone. For example, instead of encoding and storing ten copies at different quality levels of the same media content, the user stores a single copy and uses the JIT encoder 108 to create the slices at the appropriate quality profiles when needed. This way when watching on the TV, the JIT encoder 108 may deliver the media content at an HD quality level, for example, and when watching on the tablet, the JIT encoder 108 may deliver the same media content at a lower quality level. It should be noted that these embodiments are different than just instructing an encoder to encode media content at a specified quality profile. In these embodiments, the JIT encoder 108 may receive a request to encode a first portion of media content at a first bit rate, and then receive a request to encode a subsequent portion of the media content at a second bit rate. The requests could be completely arbitrary and mutually exclusive, as opposed to programming an encoder to encode the media content at one of the specified quality profiles.

In one embodiment, when the JIT encoder 108 receives a request for a slice from a media player 110, the JIT encoder can find the appropriate range of time of the media from the encoded media content 142, which may be referred to as the original mezzanine file. The JIT encoder 108 extracts the range and encodes it to the specified quality level (e.g., F), and delivers the slice to the media player 110 on demand, or just-in-time. This operation may be fairly fast that can be done in a few hundred milliseconds on typical hardware of typical computing systems.

Conventionally when encoding, the decoder can start at the beginning of an original mezzanine file and provide audio and video samples into audio and video buffers. When there is enough data in the buffers equal to a slice, this data can be pushed out of the buffers to be encoded into an encoded slice. The following description indicates how the embodiments described herein can encode slices.

Figure 2:
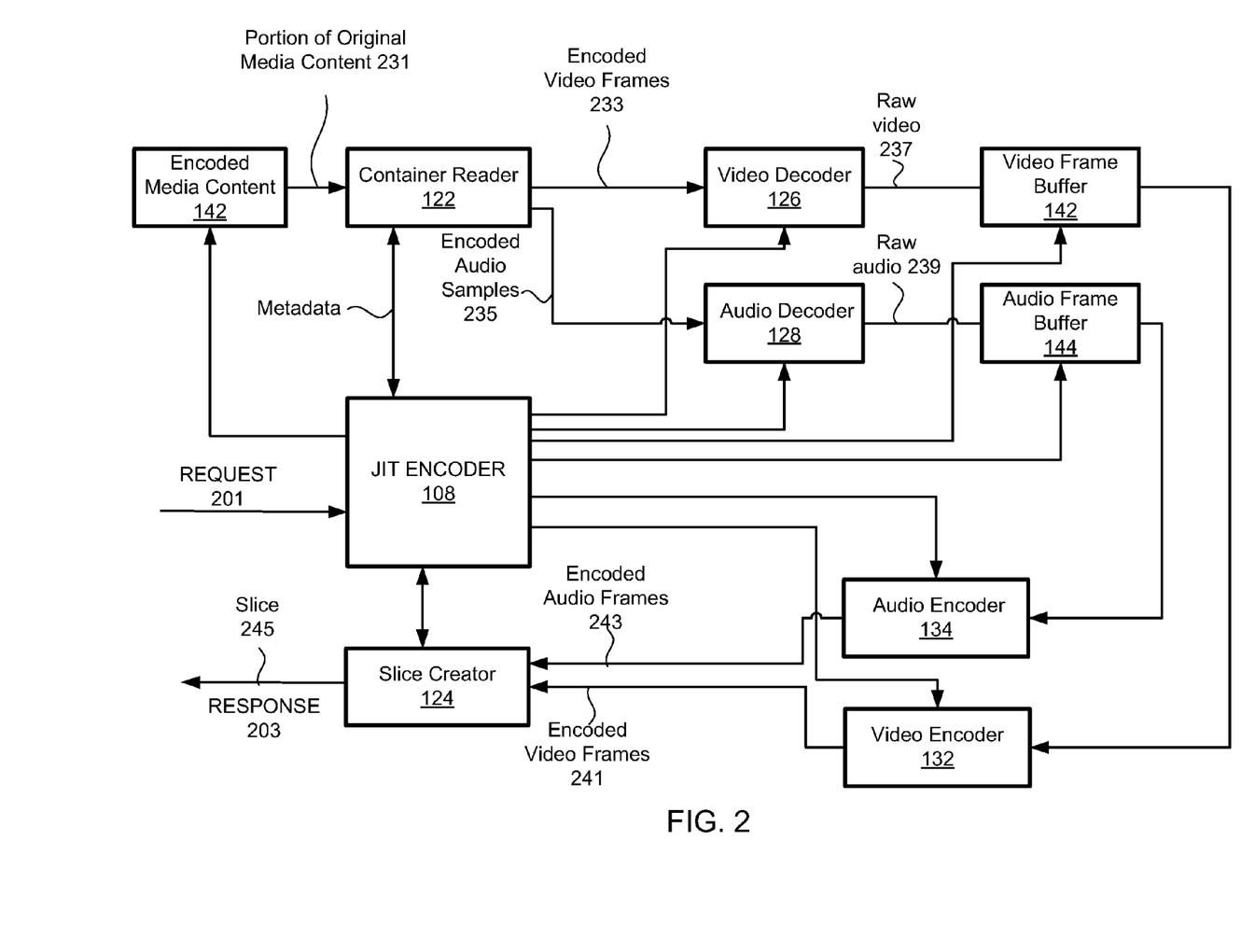
FIG. 2 is a diagram that illustrates a flow of operation of the JIT encoder to encode a portion of media content in a just-in-time fashion according to one embodiment.

FIG. 2 is a diagram that illustrates a flow of operation of the JIT encoder 108 to encode a portion of media content in a just-in-time fashion according to one embodiment. Just-in-time encoding, as used herein, refers to encoding of portions of media content that were not previously stored or encoded at the specified quality levels before being requested by the clients. For example, the just-in-time encoding can be performed at a rate sufficient to be able to deliver and present the requested portion to a user at the originally anticipated playback speed without significant interruption of playback of the media content. Although the portions of the media content may not be previously encoded and stored as different copies of the media content encoded at the specified quality levels, the portions of media have been analyzed to be able to quickly identify the portion to be encoded for delivery in response to the request as described herein. It should be noted that in some cases the portions of media content may be previously encoded, but not encoded at the specified quality levels, such as, for example, for adaptive streaming (e.g., multiple copies of the media content encoded at multiple quality levels). For example, the original copy of the media content could be encoded and stored and the just-in-time encoding encodes the requested portion at the requested quality level. This way, multiple copies at the different quality levels do not need to be stored, since the JIT encoder can encode the requested portion when requested on-demand.

In one embodiment, when an encoded media content file is added to a content library, the JIT encoder server 108 can process the media content file. For example, the media content file may be an MP4 file. The MP4 file is the container that stores metadata and the actual audio and video samples. The actual audio and video samples have been encoded using a codec, such as AAC, H264, or the like. Using the container reader 122, the JIT encoder 108 can read the metadata information from the container. Reading metadata information from the container is not a computationally intensive operation as compared to decoding the audio and video samples. Using the container reader 122, the JIT encoder 108 can scan the media content file, looking for all the video key frames. The JIT encoder 108 creates an index of the media content file, and the video key frames can become index points. This index can be created when adding the media content file to the content library or at a time before receiving requests 201 from clients. Alternatively, this index can be created at the time of receiving the request "on the fly," if not previously processed.

The key frames have a corresponding time stamp and the JIT encoder 108 can use the time stamps of the key frames to determine the relation between the key frames. For example, if there is a key frame at 15 seconds into the media content and the second key frame is at 33 seconds, and a request 201 comes in for the media content between 20 and 25 seconds, the JIT encoder 108 can start reading back at the key frame at the 15 seconds in order to decode the video and audio samples up to the 25 seconds so that the JIT encoder 108 can create a slice containing the media content at 20-25. The JIT encoder 108, using the video decoder 126 and audio decoder 128, decodes the encoded video frames 233 and the encoded audio samples 235 to obtain the raw video 237 and the raw audio 239, respectively. These samples are stored in the video frame buffer 142 and audio frame buffer 144. The JIT encoder 108 can discard the samples that are outside the requested time range, and The JIT encoder 108, using the video encoder 132, encodes the raw video 237 (for the requested time range) into encoded video frames 241, and, using the audio encoder 134, encodes the raw audio 239 (for the requested time range) into encoded audio frames 243. The JIT encoder 108 can instruct the video encoder 132 and the audio encoder 134 of the quality profile to be used for encoding the audio and video. The JIT encoder 108, using the slice creator 124, creates a slice 245 having the encoded video frames 241 and the encoded audio frames 243 for the requested time range, and sends the slice 245 in a response 203 to the requesting client.

In one embodiment, a new key frame may be created at the identified time index, even if the sample at that time was not a key frame previously. Continuing the example from above, the JIT encoder 108, using the slice creator 124 may create a slice of 20-25 seconds with a key frame at 20 seconds. In another embodiment, the JIT encoder 108 may create a slice between 15-25 seconds and the key frame at 15 seconds is still used. However, this may introduce additional delay to decode and play the slice at the media player 110. In this embodiment, the media player 110 may be instructed to decode the samples, but only render the decoded audio and video for the requested time range. Either way, the slice 245 has a key frame in order for the media player 110 to be able to decode and play the media content. This may be different than conventional encoding for adaptive streaming because conventional encoding forces key frames at fixed time boundaries. In particular, the encoder would read the files sequentially and would decode every frame to obtain multiple raw frames, and then the encoder would take those raw frames in batches and encode them, forcing the first frame of the batch to be a key frame so that each batch of frames would be independently decodable.

The JIT encoder 108, which access the media content with random access, finds the first video frame it needs to satisfy the request, and this video frame may not be independently decodable. In that case, the JIT encoder 108, using the index can go back to the most recent key frame previous in time than the first video frame that it needs in order to encode the first video frame as a key frame that is independently decodable even though previously it was not independently decodable.

It should be noted that the JIT encoder 108 may be used in an adaptive streaming context, as well as other streaming contexts that are not adaptive streaming. For example, if a user may be playing a video on a mobile phone while in transit. The media player on the mobile phone will retrieve the metadata descriptor file and determine what quality profiles are available for that video and where to retrieve the video. As described above, the metadata descriptor file may refer to files or portions of files that do not exist yet, and the JIT encoder 108 can receive requests from the media player for different portions of the video at one or more different quality profiles. For example, the media player may start out requesting media content that has been encoded at a 200 kb/s rate and determines that it can get better, and start requesting portions of the media content at a higher rate. As far as the mobile phone and media player is concerned, the media content has been encoded according to the different quality profiles for the adaptive streaming, and does not know that the JIT encoder 108 may be encoding the media content "on the fly," instead of serving static files that are stored as separate copies at the different quality profiles. In other embodiments, the JIT encoder 108 may be used until the media content is receiving a specified number of requests for the media content. For example, when the JIT encoder 108 receives the specified number of requests, the JIT encoder 108 can instruct that an encoder encode the media content into the different quality profiles and actually stores the media content for regular adaptive streaming.

In one embodiment, when doing the preprocessing of the media content, the JIT encoder 108 can read the encoded media content 142, using the container reader 122 without actually decoding the encoded video frames 233 and the encoded audio samples. In effect, the container reader 122 can read a container (sometimes called a wrapper) to obtain metadata information, and can read the pass the video and audio samples to the decoder, but instruct the decoder not to decode, for example, to determine which video frames are key frames without using the computational resources to decode the actual video frames. Alternatively, the encoded video frames 233 and audio samples 235 can be discarded before being sent to the decoders. In one embodiment, there is a container and the container has the audio samples and the video frames that are encoded. The container can be opened and read without using computational resources to decode the audio samples and video frames, especially, since this pre-processing does not require decoded the video frames to obtain the actual pixel data or the audio samples. These frames and samples can be discarded before the decoders or the decoders can be instructed not to decode in order to quickly process the encoded media content 142. In one embodiment, the pre-processing may be done by a pipeline processing architecture as illustrated in FIG. 2 in which the JIT encoder 108 orchestrates the pre-processing. In one exemplary embodiment, the JIT encoder 108 fetches a file (or portion of a file) that has the encoded media content 142. The container reader 122 reads the container, such as the AVI container or MP4 container (or other types of containers, such as MP3, MKV, or the like). The container reader 122 outputs the encoded video frames 233 and the encoded audio samples 235, as well as any other metadata information in the container. For example, an MP4 container may indicate that there are 2 media tracks in this file, one being video the other audio, that the video is H264 encoded, and the audio is AAC in stereo. When the container reader 122 outputs the frames and samples, the JIT encoder 108 can determine the track of the frame or sample, whether it is audio or video. The video frames being output may also include a flag that indicates that it is a key frame. The JIT encoder 108 can identify the type and duration of the samples and frames. For example, the JIT encoder 108 can determine that a video frame has a presentation time of 20.2 seconds from the beginning and it is a key frame and that the corresponding audio has 1024 audio samples. Although the actual data has not been accessed yet, the output of the container reader 122 splits into two different pipelines, one pipeline for the audio codec (audio decoder 128), and the other for the video codec (video decoder 126). The decoders, when instructed to decode, output the raw video frame 237 and the raw audio samples 239 into the video frame buffer 142 and the audio frame buffer 144, respectively. Thus, the JIT encoder 108 can instruct the decoders to not encode the video frames 233 and the audio samples 235 when performing the pre-processing. However, when services a request 201, the JIT encoder 108 can instruct the decoders to encode the video frames 233 and the audio samples 235. In another embodiment, the JIT encoder 108 may be configured to not send the video frames and audio samples to the decoders when performing the pre-processing. In another embodiment, the JIT encoder 108 may be configured to instruct the decoders to discard the video frames and audio samples. Alternatively, the JIT encoder 108 can use a series of commands to turn the decoders on and off. When the decoders are off the video frames and audio frames may be passed through without being decoded and then subsequently discarded.

In one embodiment, the JIT encoder 108 may record a presentation for all key frames and the location of the key frame within the actual file. This is done to build the index of these points that can be jumped to in order to start reading the data when decoding and encoding the data into the slice 245.

In another embodiment, when the preprocessing is done in connection with the request, the JIT encoder 108 can read the encoded media content 142 to determine the index points for the key frames. When the JIT encoder 108 reaches or is approaching the desired starting point, it can start to decoding the key frame and may discard everything until then. This way, the JIT encoder 108 does not use a lot of computational resources decoding all frames up to the requested time, but can start decoding the key frame and subsequent frames that will be needed in order to decode the first frame of the requested time range. These decoded frames can be stored in the video frame buffer 142. In another embodiment, the JIT encoder 108 can discard everything until it has identified the specific key frame needed to decode the first frame of the requested time range, and then go back and start decoding from the key frame up through the requested time range. The video and audio stored in the buffers can then be used to create a slice for the requested time range. In particular, the JIT encoder 108 can instruct the audio encoder 134 and video encoder 132 to encode the raw data into encoded audio frames and video frames for the slice 245. The JIT encoder 108 can instruct the slice creator 124 to create the slice with the necessary encoded audio frames and video frames.

In another embodiment, when the first frame of the requested time range is not a key frame, the JIT encoder 108 can decode the frame as described above (decoding from the previous key frame and any intervening delta frames), and then encode this first frame as a key frame. The subsequent frames to this first frame may be able to be copied from the original data so that the JIT encoder 108 does not have to re-encode the subsequent delta frames after the newly created key frame. This may speed up the operation, and may not lose any quality by re-encoding the video frames. Alternatively, the JIT encoder 108 can re-encode all video frames again as would be appreciated by one of ordinary skill in the art having the benefit of this disclosure.

Described herein are methods and systems for decoding descriptive information from a container without decoding or preventing the decoding of the actual video data within the container. Also, described herein are methods and systems for random access encoding that can be performed just-in-time. In this, the embodiments may create an index so that frames that are not independently decodable (delta frames) can be decoded and encoded as a key frame that is independently decodable. The subsequent delta frames may be encoded again or may be copied from the original data.

Figure 3:
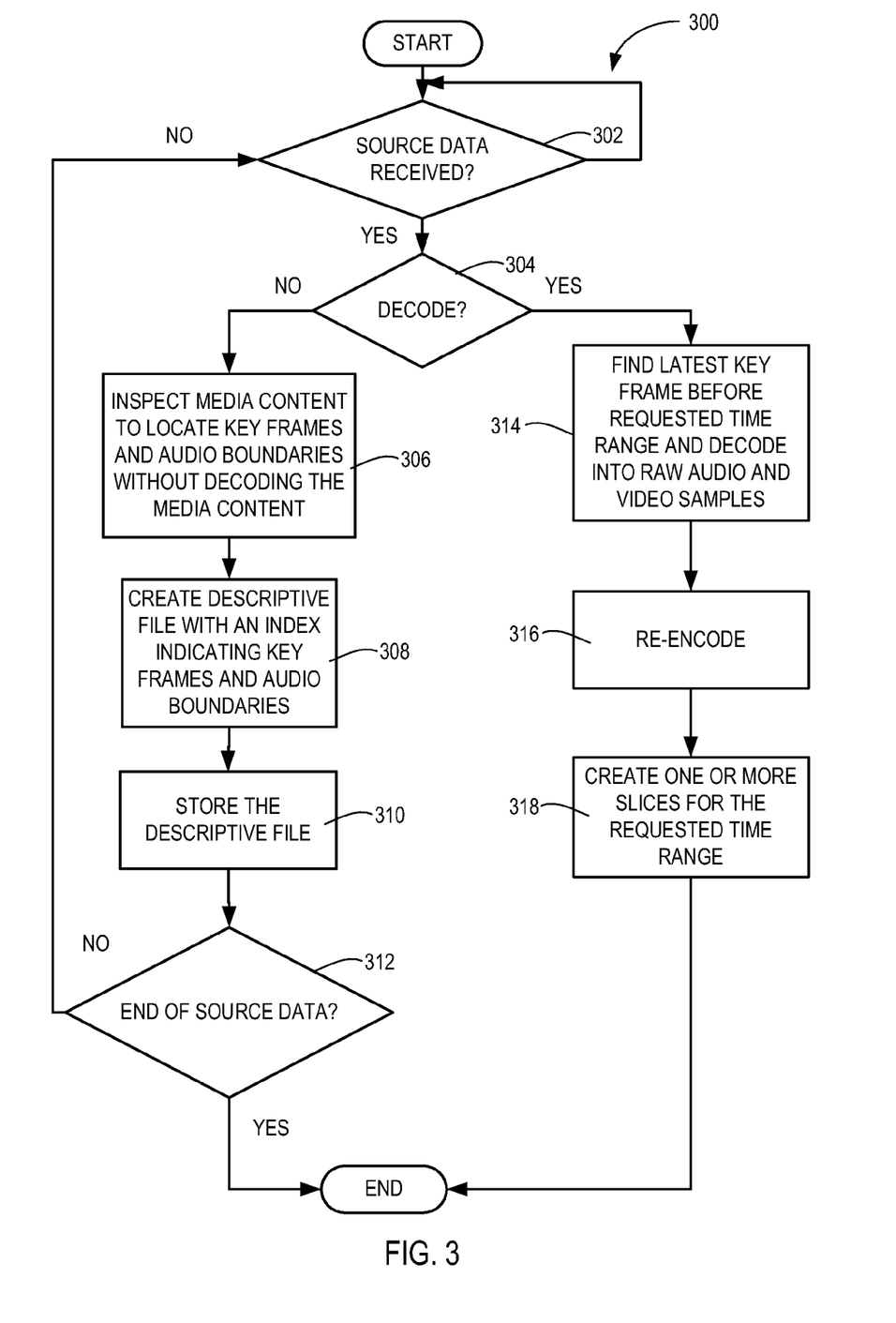
FIG. 3 is a flow diagram of one embodiment of a method of encoding media content just-in-time.

FIG. 3 is a flow diagram of one embodiment of a method 300 of encoding media content just-in-time. The method 300 is performed by processing logic that may comprise hardware (circuitry, dedicated logic, etc.), software (such as is run on a general purpose computing system or a dedicated machine), firmware (embedded software), or any combination thereof. In one embodiment, the JIT encoder 108 of FIGS. 1 and 2 performs the method 300. Alternatively, other components of the server computing system 106 can perform some or all of the operations of method 300.

Referring to FIG. 3, processing logic begins with determining whether source data (source file or source feed) of the encoded media content is received (block 302). The source may be retrieved by the processing logic from a data storage device or from another source in response to a request to deliver a portion of the encoded media content. If the source data is not received at block 302, the processing logic continues to wait until the source data is received. If the source data is received, the processing logic determines if the source signal is to be decoded or not (block 304). For example, the source signals may not be decoded when the pre-processing the encoded media content to create an index of the key frames. If at block 304 the source data is not to be decoded, the processing logic inspects the media content of the source data to locate key frames and audio boundaries without decoding the media content (block 306), creates a descriptive file with an index indicating the location of the key frames and the audio boundaries (block 308), and stores the descriptive file for subsequent use by the processing logic to decode and encode slices just-in-time (block 310). The processing logic determines if the end source data is reached (block 312). If so, the method 300 ends; otherwise, the processing logic returns to block 302.

At block 304, the processing logic may determine to decode the media content at block 304, such as after the index in the descriptive file has been created, or if the request for a specified time range of the media content is received concurrently with processing the encoded media content for the first time. In this embodiment, the source data received at 302 may be a result of the processing logic requesting a file of the encoded media content or a portion of the file, such as using a data range request. In one embodiment, the processing logic finds the latest key frame before the requested time range and decodes from the latest key frame through a last frame at the end of the requested range (block 314). The processing logic can read the source data without decoding the video frames and audio samples until it finds the latest key frame before the requested time range or can reference the index to determine the latest key frame. The processing logic re-encodes the raw video and audio (block 316) and creates one or more slices for the requested time range (block 318). The one or more slices may include more frames than the requested time range and these frames can be disregarded by the client during playback.

Figure 4:
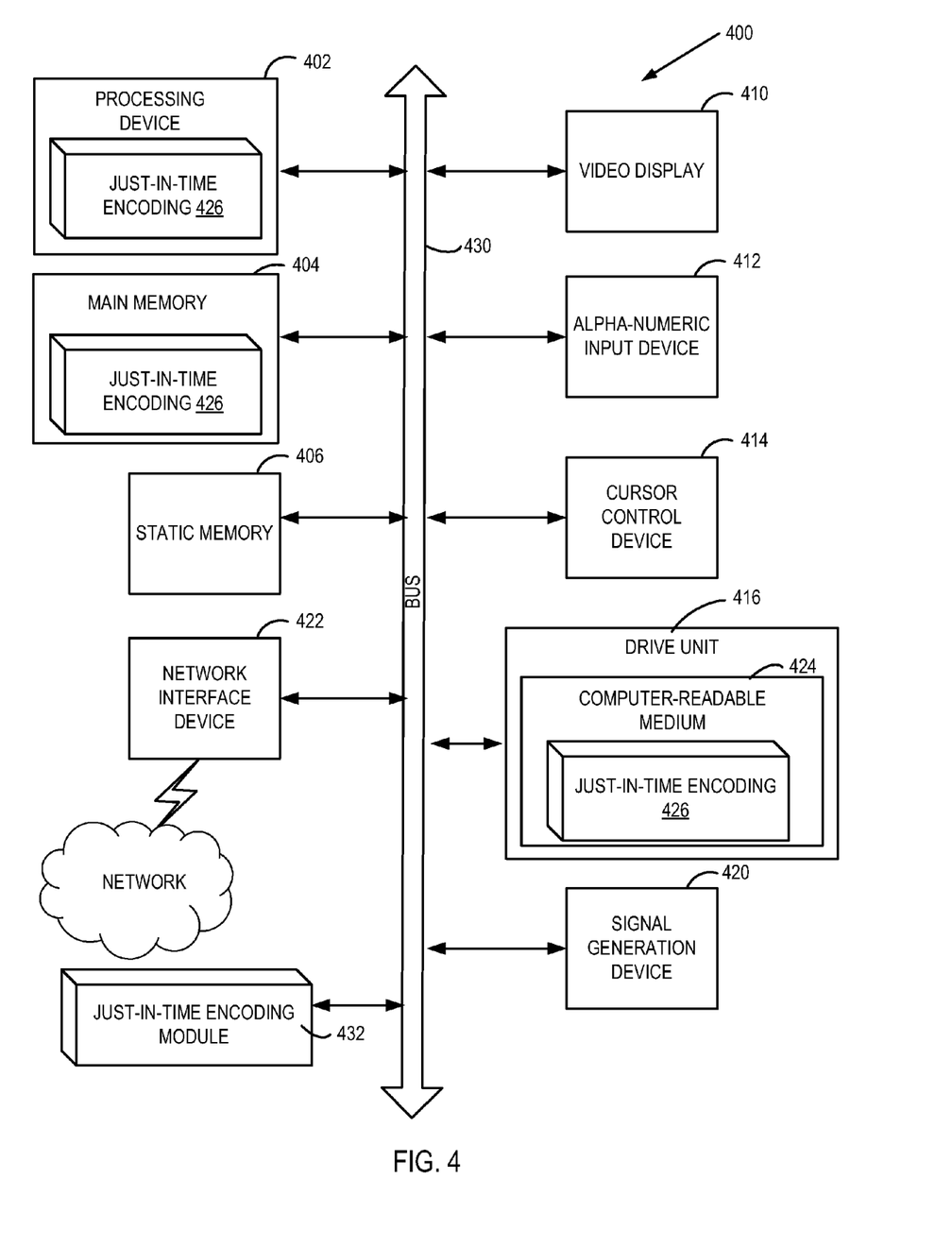
FIG. 4 illustrates a diagrammatic representation of a machine in the exemplary form of a computing system for encoding media content just-in-time.

FIG. 4 illustrates a diagrammatic representation of a machine in the exemplary form of a computing system 400 for encoding media content just-in-time. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for just-in-time encoding, such as the method 300 described above. In one embodiment, the computing system 400 represents various components that may be implemented in the server computing system 106 as described above. Alternatively, the server computing system 106 may include more or less components as illustrated in the computing system 400.

The exemplary computing system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., just-in-time encoding 426) for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., just-in-time encoding 426) embodying any one or more of the methodologies or functions described herein. The just-in-time encoding 426 may also reside, completely or at least partially, within the main memory 404 and/or within the processing device 402 during execution thereof by the computing system 400, the main memory 404 and the processing device 402 also constituting computer-readable storage media. The just-in-time encoding 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing a set of instructions for execution by the machine and that causes the machine to perform any one or more of the methodologies of the present embodiments. The term "non-transitory computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The just-in-time encoding module 432, components, and other features described herein (for example in relation to FIG. 3) can be implemented as discrete hardware components or integrated in the functionality of hardware components such as ASICS, FPGAs, DSPs, or similar devices. The just-in-time encoding module 432 may implement operations of just-in-time encoding as described herein with respect to FIG. 3. In addition, the just-in-time encoding module 432 can be implemented as firmware or functional circuitry within hardware devices. Further, the just-in-time encoding module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   during a first time period:
   receiving source data having media content at a just-in-time (JIT) encoder executing on a computing system, the media content containing compressed video and compressed audio;
   inspecting the media content to locate key frames and audio boundaries without decoding the media content;
   creating, responsive to the inspecting and without decoding the media content, an index indicating the key frames and audio boundaries of the media content, wherein the creating the index comprises creating a metadata descriptor file of the media content, wherein the metadata descriptor file specifies a plurality of different quality profiles and locations of where the media content encoded according to the plurality of different quality profiles will be stored during a second time period; and
   storing the index for subsequent just-in-time encoding of the media content;
   during the second time period, which comes after the first time period:
   receiving, at the computing system from a second computing system, a request for a specified time range of the media content at a first quality level of a plurality of specified quality levels, wherein the first quality level corresponds to a specified quality profile of the plurality of different quality profiles;
   inspecting, by the JIT encoder, the metadata descriptor file to identify a location associated with the specified quality profile;
   finding, by the JIT encoder, a latest key frame before a first frame of the media content at the specified time range in the index;

decoding, by the JIT encoder, the media content from the latest key frame through a last frame of the media content of the specified time range, to generate decoded media content;

re-encoding, by the JIT encoder, the decoded media content according to the first quality level, to generate re-encoded media content;

creating, by the JIT encoder, one or more slices of the re-encoded media content for the specified time range; and storing, by the JIT encoder, the one or more slices at the location specified in the metadata descriptor file for the specified quality profile.

2. The method of claim 1, wherein the finding, decoding, re-encoding, creating are performed at a rate to deliver and present a requested portion of the media content to a user at an originally anticipated playback speed without interruption of playback of the media content.

3. The method of claim 1, wherein the metadata descriptor file is a M3U file.

4. The method of claim 3, wherein the metadata descriptor file comprises a unique content identifier (UCID) and a duration of the media content.

5. The method of claim 1, wherein each of the plurality of quality profiles specify at least one of image size, video bit rate, audio bit rate, audio sample rate, number of audio tracks, frame rate, or staging size.

6. The method of claim 1, wherein each line of the metadata descriptor file includes at least one of an absolute pathname, a local pathname relative to the location, or a Uniform Resource Locator of the location where the media content encoded according to one quality profile is to be stored.

7. The method of claim 1, further comprising sending a response with the one or more slices to the second computing system.

8. The method of claim 1, wherein the one or more slices comprise one or more first slices, the method further comprising, during the second period:

predictively re-encoding the decoded media content according to at least a second quality level of the plurality of specified quality levels, to generate second re-encoded media content;

creating one or more second slices of the second re-encoded media content for the specified time range; and storing the one or more second slices at a second location specified in the metadata descriptor file for a second quality profile corresponding to the second quality level.

9. The method of claim 8, wherein the one or more first slices and second slices are stored in transport stream files, and wherein the metadata descriptor file specifies addresses of the transport stream files.

10. A non-transitory computer readable storage medium comprising instructions that, when executed by a server computing system, cause the server computing system to:

during a first time period:

receive source data having media content at a just-in-time (JIT) encoder executing on the server computing system, the media content containing compressed video and compressed audio;

inspect the media content to locate key frames and audio boundaries without decoding the media content;

create, responsive to inspecting the media content and without decoding the media content, an index indicating the key frames and audio boundaries of the media content, wherein to create the index comprises to create a metadata descriptor file of the media content, wherein the metadata descriptor file specifies a plurality of different quality profiles and locations of where the media content encoded according to the plurality of different quality profiles will be stored during a second time period; and store the index for subsequent just-in-time encoding of the media content;

during the second time period, which comes after the first time period:

receive, at the server computing system, a request for a specified time range of the media content at a first quality level of a plurality of specified quality levels, wherein the first quality level corresponds to a specified quality profile of the plurality of different quality profiles;

inspect, by the JIT encoder, the metadata descriptor file to identify a location associated with the specified quality profile;

find, by the JIT encoder, a latest key frame before a first frame of the media content at the specified time range in the index;

decode, by the JIT encoder, the media content from the latest key frame through a last frame of the media content of the specified time range, to generate decoded media content;

re-encode, by the JIT encoder, the decoded media content according to the first quality level, to generate re-encoded media content;

create, by the JIT encoder, one or more slices of the re-encoded media content for the specified time range; and storing, by the JIT encoder, the one or more slices at the location specified in the metadata descriptor file for the specified quality profile.

11. The non-transitory computer readable storage medium of claim 10, wherein to find, to decode, to re-encode, and to create are performed at a rate to deliver and present a requested portion of the media content to a user at an originally anticipated playback speed without interruption of playback of the media content.

12. The non-transitory computer readable storage medium of claim 10, wherein each line of the descriptor file includes at least one of an absolute pathname, a local pathname relative to the location, or a Uniform Resource Locator of the location where the media content encoded according to one quality profile is to be stored.

13. The non-transitory computer readable storage medium of claim 10, wherein the instructions that, when executed by a server computing system, further cause the server computing system to send a response with the one or more slices to the second computing system.

14. The non-transitory computer readable storage medium of claim 10, wherein the one or more slices comprise one or more first slices, and wherein the instructions that, when executed by a server computing system, further cause the server computing system to, during the second period:

predictively re-encode the decoded media content according to at least a second quality level of the plurality of specified quality levels, to generate second re-encoded media content;

create one or more second slices of the second re-encoded media content for the specified time range; and store the one or more second slices at a second location specified in the metadata descriptor file for a second quality profile corresponding to the second quality level.

15. The non-transitory computer readable storage medium of claim 14, wherein the one or more first slices and second slices are stored in transport stream files, and wherein the metadata descriptor file specifies addresses of the transport stream files.

16. A first computing system, comprising:
a data storage device; and
a processing device, coupled to the data storage device, to execute a just-in-time (JIT) encoder, wherein the JIT encoder is to:
during a first time period:
receive source data having media content containing compressed video and compressed audio;
inspect the media content to locate key frames and audio boundaries without decoding the media content;
create, responsive to inspecting the media content and without decoding the media content, an index indicating the key frames and audio boundaries of the media content, wherein to create the index comprises to create a metadata descriptor file of the media content, wherein the metadata descriptor file specifies a plurality of different quality profiles and locations of where the media content encoded according to the plurality of different quality profiles will be stored during a second time period; and
store the index for subsequent just-in-time encoding of the media content;
during the second time period, which comes after the first time period:
receive, from a second computing system, a request for a specified time range of the media content at a first quality level of a plurality of specified quality levels, wherein the first quality level corresponds to a specified quality profile of the plurality of different quality profiles;
inspect the metadata descriptor file to identify a location associated with the specified quality profile;
find a latest key frame before a first frame of the media content at the specified time range in the index;
decode the media content from the latest key frame through a last frame of the media content of the specified time range, to generate decoded media content;
re-encode the decoded media content according to the first quality level, to generate re-encoded media content;
create one or more slices of the re-encoded media content for the specified time range; and
storing, by the JIT encoder, the one or more slices at the location specified in the metadata descriptor file for the specified quality profile.

17. The first computing system of claim 16, wherein the processing device is further to execute a web server to receive requests, from clients, for specially requested portions of the media content at the specified quality levels, and to send responses to the requests with the one or more slices.

18. The first computing system of claim 16, wherein the media content is stored in a media content file comprising a container having metadata, audio samples and video samples of the media content, wherein the processing device is further to execute:
a web server to receive requests from clients for specially requested portions of the media content at the specified quality levels, and to send responses with the one or more slices to the clients;
a container reader to read the metadata from the container to inspect the media content to locate the key frames and audio boundaries without decoding the audio samples and the video samples, wherein the JIT encoder creates the index of the media content using time stamps of the key frames;
an audio decoder to decode the audio samples of the requested portions to obtain raw audio of the requested portions and to store the raw audio in an audio frame buffer;
a video decoder to decode the video samples of the requested portions to obtain raw video of the requested portions and to store the raw video in a video frame buffer;
an audio encoder to re-encode the raw audio according to an audio bit rate identified in the specified quality profile, to generate re-encoded audio;
a video encoder to re-encode the raw video according to a video bit rate identified in the specified quality profile, to generate re-encoded video; and
a slice creator to create the one or more slices with the re-encoded audio and the re-encoded video.

19. The first computing system of claim 16, wherein each line of the descriptor file includes at least one of an absolute pathname, a local pathname relative to the location, or a Uniform Resource Locator of the location where the media content encoded according to one quality profile is to be stored.

20. The first computing system of claim 16, wherein the JIT encoder is further to, during the second period:
predictively re-encode the decoded media content according to at least a second quality level of the plurality of specified quality levels, to generate second re-encoded media content;
create one or more second slices of the second re-encoded media content for the specified time range; and
store the one or more second slices at a second location specified in the metadata descriptor file for a second quality profile corresponding to the second quality level.

* * * * *